Oct. 28, 1952

F. ERNEST 2,615,668

VALVE

Filed Jan. 20, 1948

FRED ERNEST,
INVENTOR.

BY John Flam
ATTORNEY.

Oct. 28, 1952 — F. ERNEST — 2,615,668
VALVE
Filed Jan. 20, 1948 — 3 Sheets-Sheet 2

FRED ERNEST, INVENTOR.
John Flam
ATTORNEY.

Oct. 28, 1952  F. ERNEST  2,615,668
VALVE

Filed Jan. 20, 1948  3 Sheets-Sheet 3

FRED ERNEST,
INVENTOR.

BY John Flann
ATTORNEY.

Patented Oct. 28, 1952

2,615,668

UNITED STATES PATENT OFFICE 2,615,668

VALVE

Fred Ernest, Gardena, Calif.

Application January 20, 1948, Serial No. 3,340

4 Claims. (Cl. 251—5)

The present invention relates to valve devices.

An object of the invention is to provide a valve device adapted automatically and quickly to shut off fluid flow, and which is easily manipulated to effect its full opening to permit fluid flow.

A further object of the invention is to provide a quick operating valve having a valve closing member which functions to prevent leakage around the valve parts, in addition to its normal function of preventing or restricting fluid flow through the valve.

Another object of the invention is to provide a quick closing faucet, or similar valve device, having substantially no restrictions or barriers in its path of fluid flow when in open position.

Still another object of the invention is to provide a valve device having relatively few parts which are easily maintained in a sanitary condition.

Yet a further object of the invention is to provide a valve device embodying an elastic tube, which can be constricted to vary or prevent fluid flow through the device, the parts being so shaped and arranged that the pressure of the fluid in the valve tending to flow through the tube is utilized to assist in holding the valve device in closed position.

Another object of the invention is to provide a valve device which normally tends to remain in closed position, but which can be locked readily in open position whenever desired.

This invention possesses many other advantages and has other objects which may be made more clearly apparent from a consideration of several of its embodiments. For this purpose, there are shown a few forms in the drawings accompanying and forming part of the present specification. These forms will now be described in detail illustrating the general principles of the invention; but it is to be understood that such detailed description is not to be taken in a limiting sense, since the scope of this invention is best defined by the appended claims:

Referring to the drawings:

Fig. 9 is a cross-section, with certain parts omitted, taken along the line 9—9 on Fig. 8;

Figure 1:
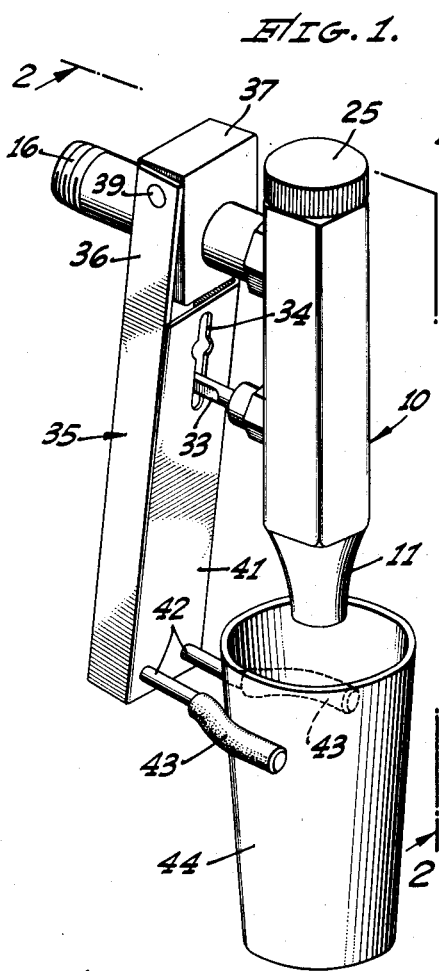
Figure 1 is a pictorial isometric representation of a valve or faucet, illustrating its mode of use.

The specific forms of valve devices illustrated in the drawings are designed primarily for the dispensing of water in restaurants, and like eating establishments. It is to be understood, however, that the valve device disclosed is of more general application than the one specifically indicated.

The valve device includes a tubular body 10, which may have a tapered lower portion 11 forming a nozzle or outlet. The body has a cylindrical passage 12, extending upwardly from its lower end, communicating and cooperating with an enlarged bore 13 to form a shoulder 14. A threaded hole 15 extends transversely through the body into its enlarged bore 13 for reception of the threaded end of a tubular nipple 16, which may be secured to a water, or other fluid supply pipe (not shown), in a known manner.

The fluid flowing from the nipple 16 into the body 10 is controlled by an elastic sleeve 17, of rubber or similar material, fitting snugly within the body passage 12 and extending upwardly into its enlarged bore 13. This sleeve is held in leak-proof relation relative to the body by a tubular clamping member 18, the enlarged upper head 19 of which is disposed within the enlarged bore 13 and is provided with a lateral port 20 communicating with the passage 21 through the nipple 16. A hollow tip 22 depends from the head 19, and is piloted within the upper end of the elastic sleeve 17. The outside diameter of the tip 22 is greater than the normal inside diameter of the elastic sleeve, in order that insertion of the tip within the sleeve will expand the upper end of the latter and clamp it against the body shoulder 14.

The clamping action just referred to is provided by a helical compression spring 23, the lower end of which bears against a disc 24 resting on the upper end of the clamping member 18, and the upper end of which bears against a cap 25 threaded into the body. For the purpose of preventing leakage around the cap, a suitable gasket 26 may be clamped between it and upper end of the body 10.

Figure 2:
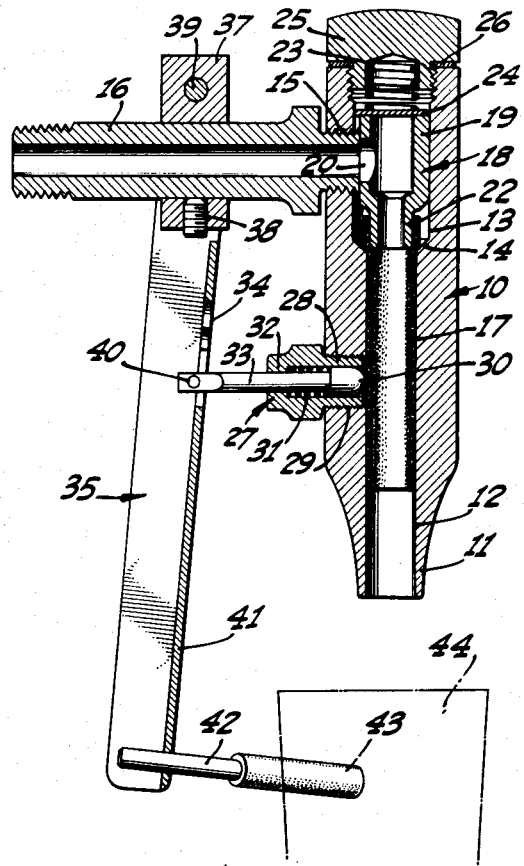
Fig. 2 is an enlarged longitudinal section taken generally along the plane 2—2 on Fig. 1, with the valve parts in open position.

It is apparent that the compressed spring 23 urges the clamping member 18 downwardly and presses the lower end of the tip 22 toward the shoulder 14, effectively clamping the sleeve 17 therebetween, as illustrated in Fig. 2.

Water, or any other liquid, flows through the nipple passage 21 and the clamping member port 20 to the interior of the latter member, proceeding directly downwardly through the tip 22 and through the elastic sleeve 17 for discharge from the body nozzle or outlet 11. In pursuing this path, the liquid has a straight line of flow through the body 10, there being substantially no restriction or barriers around which it must pass.

Leakage from the upper part of the valve body is prevented by the gasket 26 and the clamping of the sleeve 17 between the clamping member 18 and body shoulder 14. The sleeve 17 makes a substantially firm fit with the wall of the body passage 12, so that there is very little tendency for liquid to flow upwardly around the exterior of the elastic sleeve.

Flow of liquid through the sleeve is prevented or restricted by constricting the sleeve 17. Such constriction may take place through clamping or folding part of the sleeve transversely against the wall of the body passage 12. One manner of effectuating this purpose is disclosed in Figs. 1 to 4, in which a laterally extending guide 27 has its inner end 28 threaded into a companion threaded bore 29 in the tubular valve body 10. A generally spherically shape operating head 30 is slidably mounted in the guide 27, being urged in a direction transversely across the passage 12 by a helical compression spring 31 having one end engaging the head 30 and its other end an inwardly directed flange 32 on the guide. The spring exerts sufficient force to move the spherical head 30 against the exterior of the sleeve 17, deforming and folding the latter upon itself towards its diametrically opposite portion, and clamping the sleeve 17 securely between the head 30 and the wall of the body passage 12 completely to close the passage through the sleeve 17.

Figure 4:
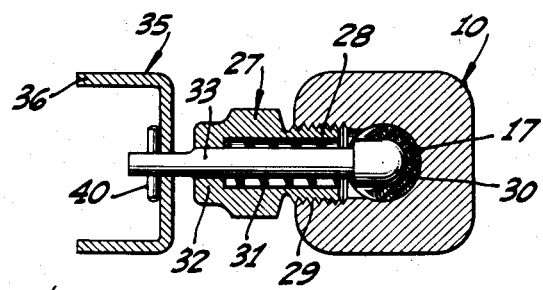
Fig. 4 is a cross-section, taken along the line 4—4 on Fig. 3.

It is to be noted that the spherical head 30 has a radius substantially equal to the radius of the body passage 12 minus twice the wall thickness of the elastic sleeve 17, in order to form substantially two semi-circular layers of co-engaging and snugly fitting elastic sleeve material, the extent of co-engagement being substantially 180° as is evident from Fig. 4. This ensures the complete closing of the passage through the sleeve 17.

Thus, the spring 31 acts upon the spherical head 28 to urge it in a direction automatically closing the valve device. The head 30 is retractable from its valve closing position by manual means. Such means includes a stem 33 secured to the head 30 and projecting outwardly of the guide 27. This stem extends through a longitudinal slot 34 in a U-shaped operating lever 35 having upwardly extending and oppositely disposed arms 36 on opposite sides of a collar 37 attached to the nipple 16 in any suitable manner, as by means of a set screw 38. A pin 39 extends through the arms 36 and collar 37 to provide a fulcrum or pivotal mounting for the lever 35. The stem 33 has a transverse pin 40 secured to it, disposed within the operating lever 35, and engaging its base 41 on opposite sides of the slot 34 to effect a connection between the lever 35 and the head stem 33.

A pair of oppositely disposed and forwardly projecting fingers 42 are secured to the lever 35. Their outer ends may have rubber coverings 43 for engagement by a glass 44, or other liquid container, which can be placed directly beneath the nozzle outlet 11 when engaged against the rubber covers 43.

When a glass is pressed against the rubber covers 43 and fingers 42, the lever 35 is swung rearwardly about its fulcrum 39 to move the stem 33 and head 30 in an outward direction against the force of the spring 31, allowing the elastic rubber sleeve 17 inherently to reassume its initial undeformed and unrestricted shape, and allowing full flow of water downwardly through the sleeve 17 and out of the nozzle 11. The parts are arranged to permit full retraction of the spherical head 30 within its guide 27 in order to provide a full unrestricted opening through the elastic sleeve 17. Of course, only partial withdrawal of the head 30 from the body passage 12 will result in corresponding partial opening of the valve.

As soon as the glass 44 is withdrawn from the operating fingers 42, the spring 31 quickly moves the spherical head 30 back across the body passage 12 and redeforms the sleeve 17 into its generally semi-circular and self contacting position, as illustrated in Fig. 4, to quickly reclose the valve.

Figure 5:
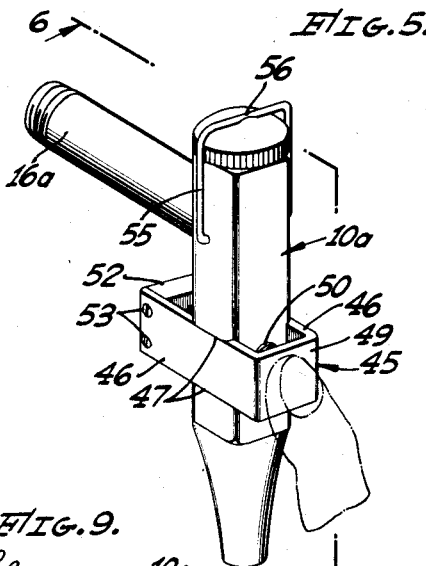
Fig. 5 is a pictorial isometric representation of another form of the invention.
Figure 6:
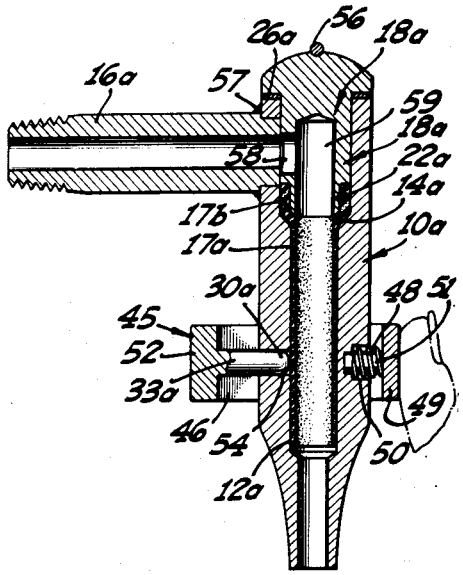
Fig. 6 is an enlarged longitudinal section, taken along the plane 6—6 on Fig. 5, with the valve parts in open position.
Figure 7:
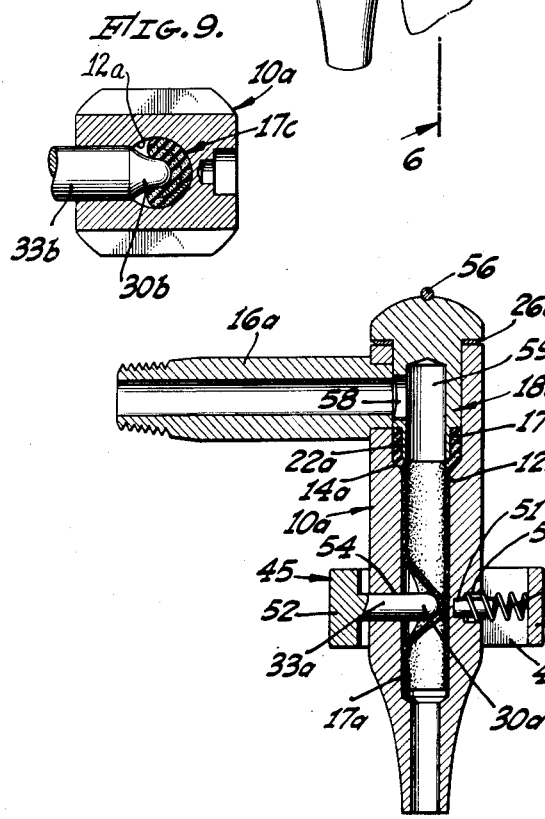
Fig. 7 is a view similar to Fig. 6, with the valve parts in closed position.

The embodiment of invention illustrated in Figs. 5, 6 and 7 is essentially the same as the other embodiment. The manual control is different, since the parts are not arranged for operation by a glass or other receptacle. Instead, the valve is open by hand pressure.

The operating member consists of a U-shaped band or strap 45, the arms 46 of which are disposed for sliding movement within external parallel channels or guides 47 formed on the body member 10a. A compressed spring 48 is disposed between the base 49 of the strap, forwardly of the body, and the base of a socket 50 formed in the exterior of the body, the spring 48 being guided in its movement by a pin 51 secured to the body 10a co-axially of its socket.

The arms 46 of the strap are secured to a plate 52 at the rear of the body by screws 53, or the like. A stem 33a is integral with, or otherwise secured to, the plate 52 projecting inwardly through a lateral bore 54 in the body. The inner end of the stem is formed as a spherical head 30a in the same manner and shape as in the other embodiment of the invention, this head being engageable with the exterior of the elastic sleeve 17a disposed in the body bore or passage 12a to urge it toward the opposite wall of the body bore and restrict or entirely close the passage through the sleeve 17a. It is evident that the spring 48 normally urges the stem 33a and head 30a in a forward direction fully to close the valve, and that pressure exerted on the base 49 of the strap, in a rearward direction against the force of the spring, can fully retract the head 30a from the body passage 12a and allow the elastic sleeve inherently to expand to its original shape, in which its passage is completely unrestricted.

The upper portion 17b of the elastic sleeve is thickened, and is clamped against the internal body shoulder 14a by a clamping member consisting of a cap 18a having a tip 22a disposed within the upper end 17b of the sleeve. The upper end of the sleeve is clamped between the tip 22a and the shoulder 14a by a bail-shaped wire 55 pivotally mounted on the exterior of the body 10a, with its upper portion 56 adapted to bear against the upper end of the cap 18a in spring-like fashion to force the tip 22a against the sleeve 17a and urge the latter against the body shoulder 14a. Leakage between the cap 18a and body 10a is prevented by a suitable intervening gasket 26a.

The upper end of the body is attached to a nipple 16a, the inner end of which is piloted within a lateral body bore, the two parts being integrated to one another by the use of welding material 57. Fluid flows from the nipple 16a through a lateral port 58 in the clamping member 18a and into a central bore 59 in the latter, communicating with the elastic sleeve 17a. It is preferred that the inside diameter of the clamping member bore 59 be substantially equal to the inside diameter through the sleeve 17a, to ensure smooth and unrestricted flowing of liquid through the valve device.

The parts are easily assembled through swinging of the bail-shaped element 55 in a forward direction, which enables the cap 18a to be withdrawn, together with the elastic sleeve 17a. The same sleeve, or another sleeve, may be stretched over the clamping member tip 22a, and the parts inserted in the valve body 10a through its top, with the lateral port 58 in alignment with the nipple 16a. The bail 55 may then be replaced on top of the cap 18a to hold all of the parts securely together in leak-proof relation.

The exterior of the elastic sleeve 17a makes a snug fit with the wall of the body passage 12a, thereby precluding upward leakage along the exterior of the elastic sleeve and laterally outward along the head 30a and stem 33a.

Figure 8:
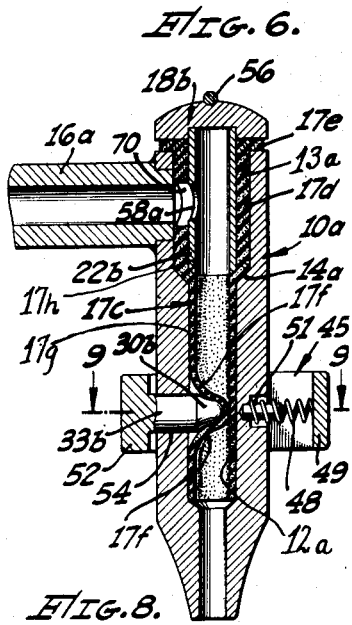
Fig. 8 is a longitudinal section through still another form of the invention.

The embodiment of invention illustrated in Figs. 8 and 9 is essentially the same as the other two embodiments, and particularly Figs. 5, 6 and 7. The body 10a has a passageway 12a and an upper enlarged bore 13a communicating therewith and forming the shoulder 14a. As shown most clearly in Fig. 8, the elastic sleeve 17c is extended upwardly to function as a gasket between the cap 18b and the upper end of the body member 10a. Thus, the elastic sleeve has an upper portion 17d received within the enlarged bore of the body, and provided with an outwardly directed flange 17e clamped between the cap 18b and the upper end of the body member 10a. The lower portion 17g of the elastic sleeve 17c is received within and conforms to the passages 12a and 13a. As in the Figs. 5 to 7 embodiment, the upper portion 56 of the bail-shaped member 55 is utilized to hold the cap in its clamping position.

The cap has a depending sleeve 22b suitably secured to it, with its lower end pressing the lower end of the upper sleeve portion 17d against the body shoulder 14a. For this purpose, a shoulder 17h is formed in the elastic sleeve 17c against which the cap sleeve 22b bears. Thus, the internal diameter of the upper portion 17d is of a size intermediate that of the internal diameter of the lower portion 17g and the internal diameter of the enlarged portion 13a of the body, thereby forming the shoulder 17h. This sleeve 22b has a port 58a formed through its side wall in alignment with a port 70 in the upper portion 17d of the elastic sleeve, to permit water or other fluid to flow from the nipple 16a into the sleeve 22b and thence downwardly through the elastic sleeve 17c for discharge from the lower end of the body 10a.

All other parts shown in Figs. 8 and 9 not specifically described are essentially the same as in Figs. 5, 6, and 7, and operate in the same manner. The stem 33b and head 30b could be exactly the same as the stem 33a and the head 30a illustrated in Figs. 6 and 7. However, it is preferred to modify these parts for the purpose of causing the pressure of the fluid within the elastic sleeve 17c to assist in maintaining the valve in closed position.

Figure 3:
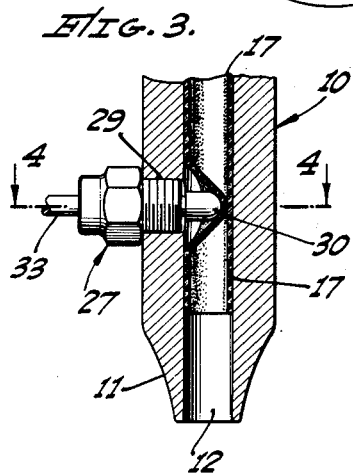
Fig. 3 is a fragmentary section, similar to Fig. 2, with the valve parts in closed position.

When the valves are in closed positions, as shown in Figs. 3 and 7, the pressure bearing against the inclined rubber sleeve portion adjacent the hemispherical head 30 or 30a exerts a lateral component of force tending to shift the valve head outwardly and open the elastic sleeve to the passage of fluid. Reliance is placed upon the spring 31 or 48 to overcome this force and maintain the valve in the desired closed condition.

The valve head shown in Figs. 8 and 9 has been modified to cause the fluid pressure in the elastic sleeve 17c to assist in holding the valve closed. At least, the component of force tending to shift the valve head outwardly is considerably reduced.

It is to be noted that the valve head 30b in Figs. 8 and 9 does not have the same diameter as the valve stem 33b. Instead, the portion of the head to the rear of its hemispherical portion is curved outwardly toward the cylindrical stem 33b. In effect, the head is smaller in diameter, being relieved forwardly of its guiding portion in the body, as compared to the other heads 30 and 30a, to permit the sleeve to fold downwardly toward the head under the influence of the pressure in the sleeve, when the head is in sleeve closing position. (Fig. 8.)

By referring to Figs. 3 and 7, it will be noted that the portion of the elastic sleeve adjacent the head 30 or 30a makes a substantial angle relative to the axis of the valve head. As a result, the pressure acting on the inclined sleeve portion exerts a force component of substantial value in a lateral outward direction, tending to shift the head and valve stem toward open position. The smaller diameter head, and the adjacent relieved portion shown in Figs. 8 and 9, however, allow the portion 17f of the sleeve adjacent the head to assume a much lesser angle relative to the head axis. Accordingly, the fluid pressure in the elastic sleeve 17c tends to deform the sleeve portion 17f downwardly around the head 30b, as shown in Fig. 8, which, due to the relatively flat angle of the portion 17f, results in a comparatively small force component tending to overcome the force of the spring 48 and shift the head outwardly to valve opening position.

It is apparent that the valve heads 30 and 30a in the other two forms of the invention could be shaped in the same general fashion as the head 30b, in order to accomplish the same results.

Figure 10:
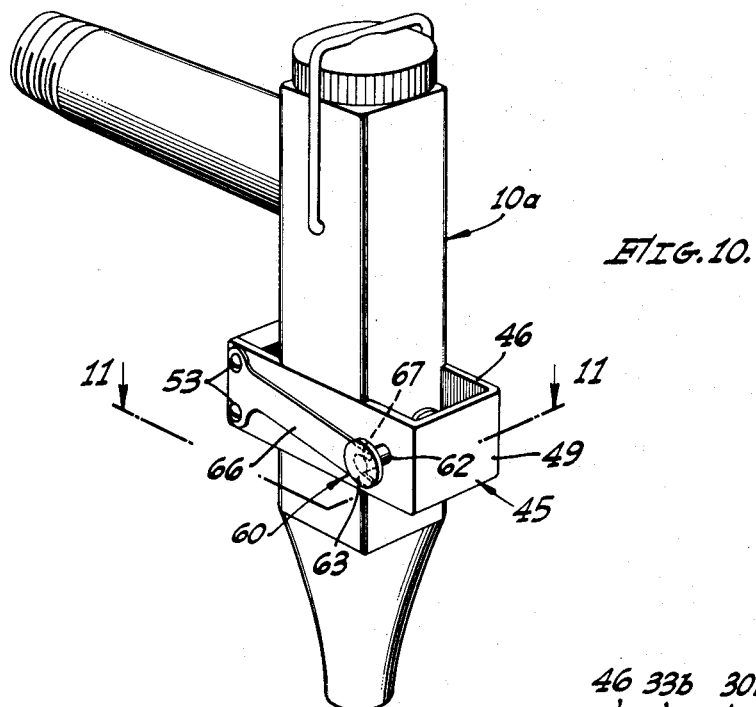
Fig. 10 is a partial isometric projection of still another form of the invention.

The valve closing springs in the various embodiments shown in drawings are constantly tending to close the valve. The valves are maintained in open position only as a result of the continued application of force by a person in opposition to the spring force. At times, however, it is desired to secure the valve in open position without the necessity for maintaining a force sufficient to overcome the various springs. This purpose is effectuated in the embodiment disclosed in Figs. 10 to 12, inclusive.

In the last mentioned form, the valve parts are essentially the same as disclosed in Figs. 5 to 9, inclusive. A lock device 60 is added to the valve body and valve operating mechanism, which is normally ineffective, until it is purposely desired to secure the valve in open position. As illustrated, one of the arms 46 of the band or strap 45 has a hole 61 receiving a detent 62 in the form of a plunger. The outer end of the detent is formed as a button 63, defining a groove 64 in conjunction with a flange 65 encircling the plunger. The flange 65 is adapted to engage the outer surface of the arm 46 for the purpose of limiting inward movement of the plunger.

Figure 11:
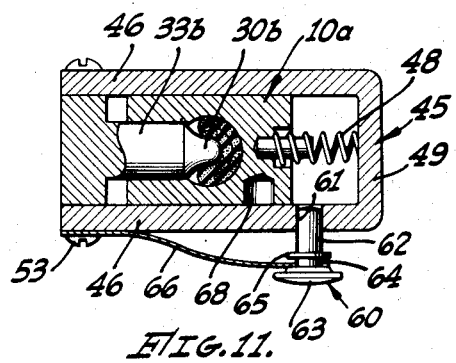
Fig. 11 is a cross-section taken along the plane indicated by the line 11—11 on Fig. 10.
Figure 12:
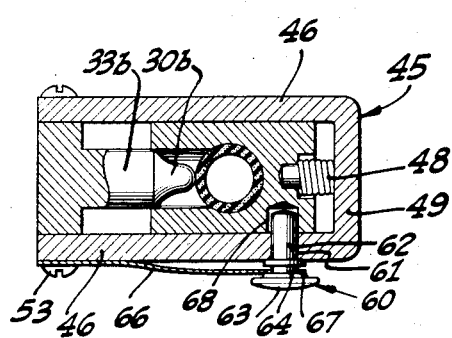
Fig. 12 is a view similar to Fig. 11 with the valve shown locked in open position.

Normally, the detent 62 is urged and maintained in an outward direction by a leaf spring 66 secured to the arm 46 by the screws 53. This leaf spring has forwardly extending bifurcated arms 67 extending into the upper and lower portions of the peripheral groove 64. The spring extends outwardly of the arm 46 in a forward direction and normally tends to bias the detent 62 in an outward direction, as illustrated in Fig. 11. The inner portion of the detent however, is maintained within the arm 46, free from the inner surface of the arm, so as not to interfere with movement of the strap 45 along the body.

The detent 62 is adapted to enter a socket 68 in the body 10a adjacent the arm 46 carrying the detent. When the valve device is to be manipulated, the detent is maintained in the ineffective position disclosed in Fig. 11, which permits the band 45 to be moved by hand against the force of the spring 48 without interference by the detent 62. Of course, the spring 48 will close the valve whenever manual pressure is withdrawn from the base 49 of the band or strap. If it is desired to lock the valve in open position, the strap 45 is pressed inwardly against the force of the spring 48 by the fingers of the hand, and the thumb forced against the button portion 63 of the detent when the latter is in alignment with the socket 68, in order to move the plunger 62 thereinto. While the thumb pressure remains on the button 63, the fingers are removed from the strap 45, allowing the spring 48 to shift the strap outwardly to a slight extent, which is sufficient to bind the plunger 62 between the body 10a and the arm 46, there being sufficient binding force or friction to overcome the tendency of the leaf spring 66 to shift the detent 62 outwardly. The valve is thus held in open position, without the necessity for maintaining pressure upon the band or strap 45 (see Fig. 12).

When the lock or latch device 60 is to be released, it is merely necessary to press the strap 45 inwardly slightly, for the purpose of removing the binding force on the detent 62. This allows the leaf spring 66 to shift the plunger 62 outwardly from the socket 68, automatically unlocking the valve device and permitting the spring 48 to move the parts to valve closing position upon release of the manual or finger pressure from the strap 45. The parts will then be placed in their normal valve closing position, such as illustrated in Fig. 11.

The inventor claims:

1. In a valve: a body having a passage therethrough and an enlarged bore defining a first shoulder with said passage, said body having a lateral port opening into said enlarged bore; an elastic sleeve through which fluids may flow, said sleeve having one portion extending within said passage, and having another portion extending within said enlarged bore, the internal diameter of said other portion being intermediate the internal diameter of said one portion and the said enlarged bore to form a second shoulder; and a tubular member in said sleeve within said enlarged portion and having an end bearing against said second shoulder to force said sleeve against said first shoulder; said tubular member having a lateral side port therein aligned with said body port.

2. In a valve: a body having a passage therethrough and an enlarged bore defining a first shoulder with said passage; an elastic sleeve through which fluids may flow, said sleeve having one portion extending within said passage, and having another portion extending within said enlarged bore, the internal diameter of said other portion being intermediate the internal diameter of said one portion and said enlarged bore to form a second shoulder; and tubular means within said enlarged portion, said means engaging said body at an outer end of said enlarged bore to close said enlarged bore, said means having a portion bearing against said second shoulder to force the sleeve against said first shoulder.

3. In a valve: a body having a passage therethrough and an enlarged bore defining a first shoulder with said passage; a tubular member secured to and extending laterally from said body; an elastic sleeve having one portion extending within said passage, and having another portion extending within said enlarged bore, the internal diameter of said other portion being intermediate the internal diameter of said one portion and said enlarged bore to form a second shoulder; and a tubular clamping member communicating with said tubular member and sleeve, said clamping member fitting within said sleeve and against said second shoulder to force said second shoulder of said sleeve against said first shoulder.

4. In a valve: a body having a passage therethrough and an enlarged bore defining a first shoulder with said passage; a tubular member secured to and extending laterally from said body; an elastic sleeve having one portion extending within said passage and having another portion extending within said enlarged bore, the internal diameter of said other portion being intermediate the internal diameter of said one portion and said enlarged bore to form a second shoulder; a tubular clamping member communicating with said tubular member and sleeve and bearing against said second shoulder to force said second shoulder against said first shoulder; and means for constricting said sleeve.

FRED ERNEST.

REFERENCES CITED

The following references are of record in the file of this patent:

UNITED STATES PATENTS

| Number | Name | Date |
| --- | --- | --- |
| 48,421 | Matthews | June 27, 1865 |
| 1,208,274 | Besler | Dec. 12, 1916 |
| 1,761,721 | Gipe | June 3, 1930 |
| 1,876,988 | Lormor | Sept. 13, 1932 |
| 1,994,098 | Fulton | Mar. 12, 1935 |
| 2,197,995 | Crowley | Apr. 23, 1940 |
| 2,305,840 | Brown | Dec. 22, 1942 |
| 2,387,660 | Hall | Oct. 23, 1945 |
| 2,471,623 | Hubbell | May 31, 1949 |

FOREIGN PATENTS

| Number | Country | Date |
| --- | --- | --- |
| 502,094 | Great Britain | of 1939 |
| 533,899 | Germany | of 1931 |